No. 756,983. PATENTED APR. 12, 1904.
A. RODOCKER.
CULTIVATOR ATTACHMENT.
APPLICATION FILED JAN. 4, 1904.
NO MODEL.
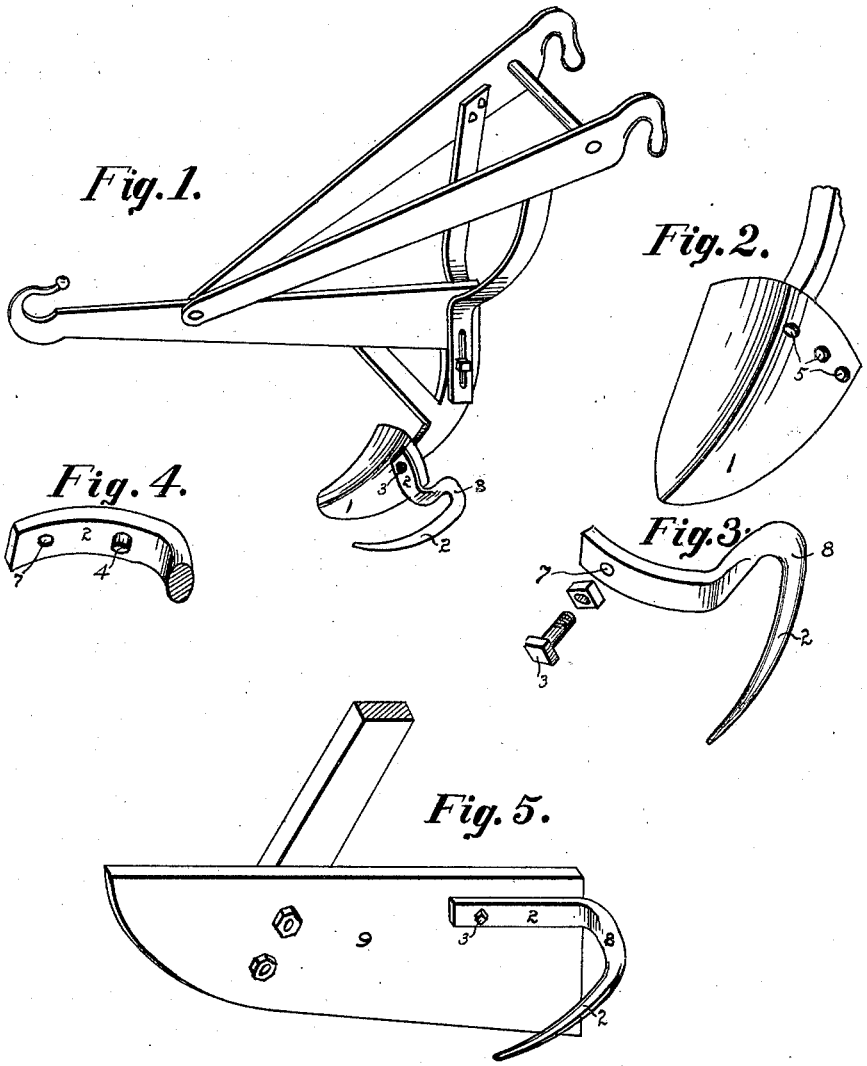
WITNESSES:
Joseph J. Hosler.
J. R. Bond.
INVENTOR
Ananias Rodocker
BY F. W. Bond
ATTORNEY No. 756,983. Patented April 12, 1904.

UNITED STATES PATENT OFFICE.

ANANIAS RODOCKER, OF MASSILLON, OHIO.

CULTIVATOR ATTACHMENT.

SPECIFICATION forming part of Letters Patent No. 756,983, dated April 12, 1904.

Application filed January 4, 1904. Serial No. 187,661. (No model.)

*To all whom it may concern:*

Be it known that I, ANANIAS RODOCKER, a citizen of the United States, residing at Massillon, in the county of Stark and State of Ohio, have invented certain new and useful Improvements in Cultivator Attachments; and I do hereby declare that the following is a full, clear, and exact description of the same, reference being had to the annexed drawings, making a part of this specification, and to the figures of reference marked thereon, in which—

Figure 1 is a perspective view of a cultivator, showing a single shovel with my attachment connected thereto. Fig. 2 is a detached view of a single shovel, showing the attachment removed. Fig. 3 is a detached view of the stalk or leaf lifter. Fig. 4 is a view showing the rear face of the leaf or stalk lifter shank. Fig. 5 is a view showing my improved leaf or stalk lifter attached to an ordinary cultivator guard-blade.

The present invention has relation to attachments for cultivators especially designed to lift leaves of corn or the stalks or of other plants when they have become covered with dirt as the cultivator is passed between the rows of the corn or other plants.

Similar numerals of reference indicate corresponding parts in all the figures of the drawings.

In the accompanying drawings, 1 represents a cultivator shovel-blade, which may be of the form shown, or it may be of any other desired form, inasmuch as the shovel-blade within itself forms no particular part of the present invention, except that my improved attachment is to be used in connection with a shovel-blade or a guard-blade, as the case may be.

To the shovel-blade 1 is attached the leaf or stalk lifter 2 by means of a suitable clamping-bolt 3, and for the purpose of rigidly holding the leaf or stalk lifter 2 with reference to the blade or guard to which it is to be attached the lug 4 is provided, which lug enters one of the apertures 5, and the clamping-bolts 6 passed through the aperture 7 and one of the apertures 5. The lifter 2 is substantially of the form shown in Fig. 3. It extends a short distance rearward or back of the blade 1 and is extended downward, so that its bottom or lower end will enter the ground and move through the loose ground as the cultivator proper is drawn forward.

It will be understood that the lifter 2 should be spaced a short distance from the edge of the shovel-blade, so that if the leaves or stalks of corn or other plants being cultivated should be turned under by reason of the dirt coming against the hill the lower portion of the lifter will come under the downturned blade or stalk. As it is moved forward it will lift the leaf or stalk, the same riding upward upon the lifter tine or arm until it strikes the inner bend 8, at which time the leaf or stalk has been elevated sufficiently to allow the bent portion to come under the leaf or stalk and pull the same at its outer end or portion without injury or without danger of tearing the leaf from the stalk or pulling the stalk out of the ground.

In Fig. 5 I have illustrated the devices attached to the guard-blade 9, and the operation is the same whether the lifting-arm 2 is attached to the guard-blade 9 or to the shovel-blade 1.

Having fully described my invention, what I claim as new, and desire to secure by Letters Patent, is—

In an attachment for cultivators, a lifting-arm secured to the shovel of the cultivator and located at one side of the shovel, said arm extended rearward at its upper end and downward and forward to the bottom end thereof, said downward and forward extending portion spaced from the edge of the shovel, substantially as and for the purpose specified.

In testimony that I claim the above I have hereunto subscribed my name in the presence of two witnesses.

ANANIAS RODOCKER.

Witnesses:
J. A. JEFFERS,
F. W. BOND.